United States Patent [19]

Ro et al.

[11] Patent Number: 5,459,116

[45] Date of Patent: Oct. 17, 1995

[54] HIGHLY ACTIVE CATALYST FOR THE POLYMERIZATION OF OLEFINS AND METHOD FOR THE PREPARATION OF THE SAME

[75] Inventors: Ki S. Ro; Min C. Chung; Tu W. Chang; Sung H. Han, all of Daejon, Rep. of Korea

[73] Assignee: Samsung General Chemicals Co., Ltd., Chungnam, Rep. of Korea

[21] Appl. No.: 234,672

[22] Filed: Apr. 28, 1994

[30] Foreign Application Priority Data

May 7, 1993 [KR] Rep. of Korea ............................... 7862
Nov. 19, 1993 [KR] Rep. of Korea ............................ 24767

[51] Int. Cl.$^6$ ............................... B01J 31/02; B01J 31/22
[52] U.S. Cl. ........................... 502/115; 502/111; 502/118; 502/127
[58] Field of Search ..................... 502/111, 115, 502/118, 127

[56] References Cited

U.S. PATENT DOCUMENTS

| | | | |
|---|---|---|---|
| 3,882,046 | 5/1975 | Pomogaib et al. | 252/429 C |
| 4,383,095 | 5/1983 | Goeke et al. | 526/88 |
| 4,990,479 | 2/1991 | Ishimaru et al. | 502/125 |

*Primary Examiner*—Anthony McFarlane
*Assistant Examiner*—Timothy H. Meeks
*Attorney, Agent, or Firm*—Harrison & Egbert

[57] ABSTRACT

Highly active catalyst for the polymerization of olefins and method for the preparation of the same.

The catalyst for the polymerization of olefins, consisting essentially of-magnesium, titanium, halogen and at least one electron donor, wherein the electron donor is selected from the group consisting of aliphatic unsaturated esters, aliphatic saturated esters, aromatic esters and the mixture thereof, which all contain at least one hydroxy group.

The catalyst is prepared by directly reacting a magnesium compound of liquid phase having no reducing power with a titanium compound of liquid phase in the presence with at least one electron donor.

Superior in activity as well as production yield in polymerizing olefins, the catalyst is capable of not only providing the polymer with high stereoregularity but also improving the bulk density of the polymer, especially polyethylene.

1 Claim, No Drawings

HIGHLY ACTIVE CATALYST FOR THE POLYMERIZATION OF OLEFINS AND METHOD FOR THE PREPARATION OF THE SAME

BACKGROUND OF THE INVENTION

1. Field of the Invention

The present invention relates, in general, to a catalyst for the polymerization of olefins, superior in various properties and a method for the preparation of the same. Particularly, the present invention relates to a catalyst capable of providing high stereoregularity to polymers or copolymers when they polymerized from α-olefins containing at least 3 carbon atoms by use of the catalyst, and a method for the preparation of the same.

2. Description of the Prior Art

Conventionally, catalysts for polymerizing olefins have been prepared from magnesium compounds and electron donors in combination with aids, such as titanium compounds, organoaluminum compounds and silicon compounds by various methods.

Japanese Laid-Open Publication Patent No. 40293/79 proposes a method for preparing a solid titanium catalyst comprising of magnesium, titanium, halogen and an electron donor, saying that a compound by a general formula, $Ti(OR^2)_4$ wherein $R^2$ is a $C_1$–$C_{10}$ alkyl, aryl or cycloalkyl and a compound represented by a general formula, $Mg(OR_1)_{2-n}X_n$ wherein $R_1$ is a $C_1$–$C_{10}$ alkyl; aryl or cycloalkyl, X is a halogen and $0<n>2$ both are used along with an electron donor. The solid titanium catalyst of the cited reference is prepared by forming a homogeneous solution of the three compounds mentioned, applying precipitation treatment to the homogeneous solution, to give a solid composition comprising magnesium, titanium and the electron donor, and contacting the composition with a titanium compound in liquid state. The precipitation treatment according to this method can be carried out by lowering the concentration of the homogeneous solution or by adding to the homogeneous solution a non-solvent for the solid ingredient to be precipitated or a recrystalline compound, such as a halogen compound of silicon or tin.

In addition, there have been disclosed a method for the preparation of solid titanium catalyst, comprising dissolving in various alcohols a magnesium compound keeping its central metal in an oxidation state of divalent in a non-active hydrocarbon solvent, to give a homogeneous solution, contacting the homogeneous solution with an electron donor, and further contacting this complex homogeneous solution with a titanium compound (see Japanese Patent No. Sho. 63-54004 and U.S. Pat. No. 4,330,649).

As mentioned above, the conventional olefins preparation methods show a disadvantage in that a step of precipitating the solid composition has to be carried out in advance of contacting the solid composition with the titanium compound. In addition, since the properties of the catalysts prepared by the conventional methods are greatly varied in dependence on the intermixing process of the constituents for catalysts, combination of the preparing stages used, and difference of the conditions employed in the process and the combination, it is impossible to convince that similar results are obtained when the catalysts are prepared under a given condition by the conventional methods. Accordingly, there is another drawback that the conventional catalysts could have extremely poor properties and capabilities.

SUMMARY OF THE INVENTION

For solving the problems encountered in prior arts, the present inventors have recognized that there exist a need for a catalyst for the polymerization of olefins, superior in properties and capabilities in polymerizing olefins, and for a method for preparing the same effectively and economically.

Therefore, it is an object of the present invention to provide a catalyst for the polymerization of olefins, superior in activity.

It is another object of the present invention to provide a catalyst for the polymerization of olefins, capable of providing the polymer with high stereoregularity.

It is a further object of the present invention to provide a catalyst for the polymerization of olefins, capable of improving the bulk density of the polymer, especially polyethylene.

It is still further object of the present invention to provide a catalyst for the polymerization of olefins, superior in production yield for the polymer.

It is still another object of the present invention to provide a method for preparing a catalyst for the polymerization of olefins, improved in effectiveness.

In accordance with the present invention, the above objects can be accomplished by providing a catalyst for the polymerization of olefins consisting essentially of magnesium, titanium, halogen and at least one electron donor, wherein said electron donor is selected from the group consisting of aliphatic unsaturated esters, aliphatic saturated esters, aromatic esters and the mixture thereof, which all contain at least one hydroxy group.

In accordance with the present invention, the above objects can be also accomplished by providing a method for preparing a catalyst for the polymerization which consists of magnesium, titanium, halogen and electron donor for the polymerization of olefins, comprising the step of contact-reacting a magnesium compound of liquid phase with a titanium compound of liquid phase on the condition of adding a monoester comprising hydroxy group and a polyester containing hydroxy group as electron donors.

These objects and other advantages of the present invention will be more apparent as following description proceeds.

DETAILED DESCRIPTION OF THE INVENTION

In the present invention, a catalyst is prepared by use of ester compound comprising at least hydroxy group, electron donor capable of facilitating-the control of the content of titanium. By contrast with the conventional methods, the present method is carried out by the direct reaction of titanium halide, without a silicon halide compound, or a tin halide compound, a recrystalline compound.

In accordance with the present invention, a solid titanium catalyst is prepared by directly reacting a magnesium compound of liquid phase having no reducing power with a titanium compound of liquid phase in the presence with at least one electron donor.

As the magnesium compound of no reducing power used in the present invention, there may be included a magnesium halide, such as magnesium chloride, magnesium bromide, magnesium iodide and magnesium fluoride, an alkoxymagnesium chloride, such as methoxymagnesium chloride, ethoxymagnesium chloride, isopropoxymagnesium chloride and butoxymagnesium chloride, an alkoxymagnesium, such as ethoxymagnesium, isopropoxymagnesium and butoxymagnesium, and the mixtures thereof.

As a solvent for the magnesium compound of liquid phase needed in the present invention, various hydrocarbons are used. The examples of the solvent are aliphatic hydrocarbons, such as hexane, heptane, octane, decane and kerosine, cyclic hydrocarbons, such as cyclohexane and cyclooctane, and aromatic hydrocarbons, such as benzene, toluene, xylene, ethylbenzene and the like. The process for forming the magnesium compound of liquid phase may varied, depending the magnesium sources and the solvents.

In case of using magnesium halide as magnesium sources, the solvent is used in an amount of about 0.1 to about 5 mole, and preferably about 0.3 to about 3 mole, based on the mole of the magnesium halide. Since the amount of the solvent varies in dependence on the conditions and the method for the catalyst preparation, it has to be determined in consideration of economy and facility in preparing the catalysts.

Also, alcohol are used to give the magnesium compound liquid phase, including aliphatic alcohols, such as methanol, ethanol, butanol, isopropanol, hexanol, 2-methylpentanol, 2-ethylbutanol, 2-ethylhexanol, n-heptanol, n-octanol, decanol and the like, cyclic alcohols, such as cyclohexanol, methylcyclohexanone and the like, and aromatic alcohols, such as benzyl alcohols, methylbenzyl alcohol, isopropylbenzyl alcohol, α-methylbenzyl alcohol, α,α-dimethylbenzyl alcohol and the like.

The amount of alcohol is on the order of about 0.1 to about 10 moles, and preferably about 3 to about 6 moles, based on the mole of the magnesium halide. For example, if too little solvent is used, the magnesium compound of liquid phase is not anticipated to be homogeneous. On the other hand, if too much solvent is used, it is disadvantageous in view of economy. Accordingly, taking into account of economy and activity, the alcohol solvent is used preferably in amounts ranging from about 3 to about 6 mole per mole of the magnesium dihalide.

For the formation of a homogeneous solution of the magnesium compound of liquid phase, magnesium dihalide comes in contact with the alcohol generally at around room temperature or more. Despite this temperature is varied in dependence on the compounds used, it is preferably between about 80° and about 200° C. and more preferably between about 90° and about 150° C. Usually, the contact is carried out for about 0.5 to about 2 hours.

Since the reaction temperature and time for the magnesium compound of liquid phase varies according to the mole ratio of the magnesium dihalide to the alcohol used and to the amount of the solvent relative to the magnesium dihalide, it is desired to seek optimal condition in consideration of the proper distribution of the constituents.

In this regard, an alcohol containing not more than 5 carbon atoms is led to use itself in amounts ranging from at least 15 moles per mole of the magnesium compound. Contact of a titanium compound with the great quantity of the alcohol for the preparation of catalyst results in considerable increases of production cost. What is still worse, the activity of the catalyst prepared is inferior to that of those prepared with alcohols containing not less than 6 carbon atoms.

As emphasized again, the catalyst for the polymerization of olefins is prepared in the presence of an electron donor, according to the present invention. The electron donor used in the present invention is a compound comprising at least one hydroxy group and at least one ester group, simultaneously. Exemplary electron donors of the present invention include unsaturated fatty acid esters comprising at least one hydroxy group, such as 2-hydroxyethyl acrylate, 2-hydroxyethyl methacrylate, 2-hydroxypropyl acrylate, 2-hydroxypropyl methacrylate, 4-hydroxybutyl acrylate, pentaerythritol triacrylate and the like, aliphatic mono- or poly-esters comprising at least one hydroxy group, such as 2-hydroxyethyl acetate, methyl 3-hydroxybutylate, ethyl 3-hydroxybutylate, methyl 2-hydroxyisobutylate, ethyl 2-hydroxyisobutylate, methyl-3-hydroxy-2-methylpropionate, 2,2-dimethyl-3-hydroxypropionate, ethyl 6-hydroxy hexanoate, t-butyl-2-hydroxyisobutylate, diethyl 3-hydroxyglutarate, ethyl lactate, isopropyl lactate, butyl lactate, isobutyl lactate, ethyl mandelate, dimethyl tartrate, ethyl tartrate, dibutyl tartrate, diethyl citrate, triethyl citrate, ethyl 2-hydroxycaproate and diethyl bis-(hydroxymethyl)malonate, aromatic esters comprising at least one hydroxy group, such as 2-hydroxyethyl benzoate, 2-hydroxyethyl salicylate, methyl 4-(hydroxymethyl)benzoate, methyl 4-hydroxybenzoate, ethyl 3-hydroxybenzoate, ethyl 4-hydroxybenzoate, methyl salicylate, ethyl salicylate, phenyl salicylate, propyl 4-hydroxybenzoate, phenyl 3-hydroxynaphthanoate, monoethylene glycol monobenzoate, diethyleneglycol monobenzoate and triethyleneglycol monobenzoate, and cyclic esters comprising at least one hydroxy group, such as hydroxybutyrolactone. Out of these mentioned electron donors, some esters were prepared in our laboratory and used.

These electron donors may be added along with the alcohol, or after adding the alcohol to make the liquid magnesium compound phase. Of course, the electron donors may be used alone or in combination therewith.

Reaction of the electron donor with the liquid magnesium compound phase is preferably carried out at 0° to 130° C. for 0.5 to 2 hours. Cooled as the reaction result is, it remains clear liquid phase without any precipitates.

The electron donor according to the present invention is present in amounts ranging from about 0.01 to about 10 moles, preferably about 0.01 to about 5 moles and more preferably about 0.05 to about 1 mole, based on the mole of the magnesium used. For example, if too little the electron donor is used, its effect on preparing the catalyst is insignificant. On the other hand, if too much the electron donor is present, the great deposition thereof in the catalyst brings about detrimental effect of which the degree may be somewhat dependent on the types and the deposition forms of the electron donor, though. Accordingly, it is preferred to select the amount of the electron donor in the proposed range.

As described above, the solid titanium catalyst according to the present invention is prepared by directly adding an excess amount of liquid titanium compound phase in a solution wherein the magnesium compound of liquid phase and the electron donor are dissolved homogeneously. It is believed that the electron donor, that is, an ester comprising at least one hydroxy group helps the titanium compound turn into titanic compound as well as be dispersed and supported on the catalyst in high degree, so that the titanic compound acts more effectively as an active ingredient. This is indirectly proved by the fact that the content of the titanic compound is virtually varied in dependence on the amount of the electron donor used.

Usually, the titanium compound of liquid phase is slowly added dropwise to the homogeneous solution comprising the magnesium compound and the electron donor, at around room temperature and then heated to activate the reaction of the titanium compound with the liquid alkylaluminum compound in the presence of the electron donor. This reaction system is heated to the temperature effective to carry out the reaction, preferably about 40° to about 130° C. and more preferably about 50° to 110° C., and for 0.5 to 4 hours.

Depending on, for example, the amount of the alcohol used, the conditions of the reaction system, the amount of the electron donor and the like, the amount of the titanium compound is properly determined. The titanium compound is added in amounts ranging from usually about at least 1 to about 200 moles, tipically from about 3 to about 200 moles and preferably about 5 mole to about 100 moles, based on the mole of the magnesium compound used.

As a result of heating the reaction system, the titanium compound is turned into a titanic compound, tetravalent, represented by the following general formula:

$$Ti(OR)_m(ED)_nX_{4-m-n}:$$

wherein

R is a hydrocarbon group;

X is a halogen atom;

ED is an ester compound which is deprived of the hydrogen of the hydroxy group contained therein by the reaction with the titanium compound;

and n and m is under the condition of $0 \leq n+m \leq 4$.

On heating the reaction system, the active hydrogens from the hydroxy group of the ester and the alcohol used react with the halogen ions from the magnesium halide, which results in hydrogen halides evaporated.

For the polymerization of olefin, the catalyst prepared according to the present invention may be used in any either liquid or gas phase. In case of liquid phase, a non-active solvent, such as hexane, heptane, cyclohexane and the like is used.

When the polymerization of olefins is carried out by use of the catalyst according to the present invention, a promoter may be used. Before the polymerization, the catalyst according to the present invention may come in contact with the promoter, so as to realize partial activation. Alternatively, the promoter may be contacted with the catalyst of the invention when the polymerization of olefins is initiated.

As the promoter used along with the catalyst for the polymerization of olefins according to the present invention, there is employed an aluminum compound such as trialkyl aluminum or dialkylaluminum chloride. The trialkyl aluminum is exemplified by triethyl aluminum, tributyl aluminum, triisobutyl aluminum and trioctyl aluminum, while the dialkylaluminum chloride by diethylaluminum chloride, dibutylaluminum chloride and diisobutylaluminum chloride.

Olefins are polymerized by the catalyst according to the present invention at temperatures ranging from about room temp. to about 150° C. and preferably about 50° to about 110° C., and under pressures ranging from about 1 atm. to about 50 kg/cm² and preferably about 2 to about 35 kg/cm².

Usually, the polymerization is carried out in a batch, continuous, or semi-continuous system. Any of these reaction systems can be applied to the polymerization of olefins by use of the catalyst according to the present invention. In addition, multistage reaction under other conditions can be applied, as well.

The polymers obtained by use of the catalyst according to the present invention exist in the form of spherical or globular particle, showing good distribution of particle size and high bulk density. The catalyst for the polymerization of olefins according to the present invention is capable of producing polyethylene of super molecular weight superior in quality. Furthermore, the α-olefins polymer prepared by the use of the catalyst according to the present invention has both high stereoregularity and high activity.

In order to better understand the nature of the present invention, a number of examples will now be described.

EXAMPLE 1

Preparation of Catalyst

Under nitrogen flux, 4.76 g (0.05 mol) of anhydrous magnesium chloride was suspended in 50 ml of purified decane and added with 31 ml (0.2 mol) of 2-ethylhexylalcohol. While being stirred, this suspension was slowly heated to 110° C., and left for 2 hours, to give a homogeneous, colorless, clear solution without any particles. Cooled as the clear solution was to room temperature, it remained colorless and clear without any precipitates formed therein.

After being cooled to 70° C., the solution was reacted with 0.6 ml (0.005 mol) of 2-hydroxyethyl methacrylate, an electron donor, for about 1 hour.

Thereafter, the solution was again cooled to room temperature, in which 33 ml (0.3 mol) of titanium tetrachloride was then added dropwise. This resulting reaction system was heated to 80° C. over 1 hour and left at this temperature for 2 hours, to complete the reaction of titanium tetrachloride. As a result, a catalyst of solid phase was prepared. This solid was washed with pure hexane until no free titanium compound was found in the washer. Then, the washed catalyst system was dried to apply it to the polymerization of olefins.

Polymerization of Olefins 10 mg of the catalyst obtained was put into a 1 L reactor which was exclusive of air and moisture and filled with nitrogen gas, to initiate the polymerization of ethylene, a reactant.

Into the reactor, 500 ml of hexane was charged along with triethyl aluminum. Under 1.5 atm of hydrogen gas, hydrogen was charged into the reactor, of which the temperature was subsequently raised to 70° C. Ethylene was added in the reactor so continuously as to make the overall pressure of the reactor 7 atm. Reaction for the polymerization of ethylene was proceeded for 1 hour. About 10 ml of ethanol was added, to terminate the polymerization.

Through a filter, the product of the polymerization was separated, and was completely dried in a vacuum oven, to obtain a polymer. Production yield was calculated.

The properties of the polymer were measured, and the results are given as shown in the following Table 1.

EXAMPLE 2

A catalyst was prepared in a manner similar to that of Example 1, except that 0.3 ml (0.025 mol) of 2-hydroxyethyl methacrylate was used as an electron donor.

Polymerization of ethylene utilizing the catalyst was carried out in a manner similar to Example 1, as well.

The properties of the polymer obtained were measured, and the results are give as shown in the following Table 1.

EXAMPLE 3

A catalyst was prepared in a manner similar to that of Example 1, except that 0.9 ml (0.075 mol) of 2-hydroxyethyl methacrylate was used as an electron donor.

Polymerization of ethylene utilizing the catalyst was carried out in a manner similar to Example 1, as well.

The properties of the polymer obtained were measured, and the results are give as shown in the following Table 1.

EXAMPLE 4

A catalyst was prepared in a manner similar to that of Example 1, except that, instead of 2-hydroxyethyl acrylate, the same equivalent of 2-hydroxyethyl acrylate was used as an electron donor.

Polymerization of ethylene utilizing the catalyst was carried out in a manner similar to Example 1, as well.

The properties of the polymer obtained were measured, and the results are give as shown in the following Table 1.

EXAMPLE 5

A catalyst was prepared in a manner similar to that of Example 1, except that, instead of 2-hydroxyethyl methacrylate, the same equivalent of diethyl 3-hydroxyglutarate was used as an electron donor.

Polymerization of ethylene utilizing the catalyst was carried out in a manner similar to Example 1, as well.

The properties of the polymer obtained were measured, and the results are give as shown in the following Table 1.

EXAMPLE 6

A catalyst was prepared in a manner similar to that of Example 1, except that, instead of 2-hydroxyethyl methacrylate, the same equivalent of 2-hydroxypropyl acrylate was used as an electron donor.

Polymerization of ethylene utilizing the catalyst was carried out in a manner similar to Example 1, as well.

The properties of the polymer obtained were measured, and the results are give as shown in the following Table 1.

EXAMPLE 7

A catalyst was prepared in a manner similar to that of Example 1, except that 23.5 ml (0.15 mol) of 2-ethylhexylalcohol was used.

Polymerization of ethylene utilizing the catalyst was carried out in a manner similar to Example 1, as well.

The properties of the polymer obtained were measured, and the results are give as shown in the following Table 1.

EXAMPLE 8

A catalyst was prepared in a manner similar to that of Example 1, except that 39 ml (0.25 mol) of 2-ethylhexylalcohol was used.

Polymerization of ethylene utilizing the catalyst was carried out in a manner similar to Example 1, as well.

The properties of the polymer obtained were measured, and the results are give as shown in the following Table 1.

EXAMPLE 9

Under nitrogen flux, 4.76 g (0.05 mol) of anhydrous magnesium chloride was suspended in 50 ml of purified decane and added with ml (0.2 mol) of 2-ethylhexylalcohol and 0.6 ml (0.005 mol) of 2-hydroxyethyl methacrylate, an electron donor, simultaneously. This suspension was subjected to reaction at 100° C. for about 2 hours. As a result, there was obtained colorless, clear solution as did in Example 1.

After lowering the temperature of the clear solution to room temperature, 33 ml (0.3 mol) of titanium tetrachloride was added dropwise to the solution. Thereafter, this reaction system further was subjected to reaction at 80° C. for 2 hours, so as to prepare a catalyst of solid phase.

Polymerization of ethylene utilizing the catalyst was carried out in a manner similar to Example 1.

The properties of the polymer obtained were measured, and the results are give as shown in the following Table 1.

EXAMPLE 10

A catalyst was prepared in a manner similar to that of Example 9, except that, instead of 2-hydroxyethyl methacrylate, the same equivalent of 2-hydroxyethyl acrylate was used as an electron donor.

Polymerization of ethylene utilizing the catalyst was carried out in a manner similar to Example 1.

The properties of the polymer obtained were measured, and the results are give as shown in the following Table 1.

EXAMPLE 11

A catalyst was prepared in a manner similar to that of Example 9, except that, instead of 2-hydroxyethyl methacrylate, the same equivalent of 2-ethyleneglycol monobenzoate was used as an electron donor.

Polymerization of ethylene utilizing the catalyst was carried out in a manner similar to Example 1, except for without charging hydrogen.

As a result of measurement according to ASTM D4020-81, the polymer obtained showed intrinsic viscosity value of about 18.9, which value, when calculated in terms of weigh average molecular weight, represents about 3 millions, which is suggestive of the possibility of the preparation of super high molecular weight polyethylene.

The properties of the polymer obtained were measured, and the results are give as shown in the following Table 1.

EXAMPLE 12

Under nitrogen flux, 4.76 g (0.05 mol) of anhydrous magnesium chloride was suspended in 30 ml of purified decane and then added with 31 ml (0.2 mol) of 2-ethylhexylalcohol. While being stirred, this suspension was slowly heated to 110° C., and left for 2 hours, to give a homogeneous, colorless, clear solution without any particles.

After being cooled to 70° C., the clear solution was reacted with 0.6 ml (0.005 mol) of 2-hydroxyethyl methacrylate, an electron donor, for about 1 hour, and still remained clear.

After its temperature being lowered to room temperature, the clear solution was slowly added dropwise to a solution consisting of 20 ml of decane and 33 ml (0.3 mol) of titanium tetrachloride. This resulting reaction system was heated to 80° C. for 2 hours, to complete the reaction with titanium tetrachloride. As a result, a catalyst of solid phase was prepared.

Polymerization of ethylene utilizing the catalyst was carried out in a manner similar to Example 1, except for without charging hydrogen.

The properties of the polymer were measured, and the results are given as shown in the following Table 1.

Comparative Example 1

Preparation of Catalyst

Under nitrogen influx, 4.76 g (0.05 mol) of anhydrous magnesium chloride was suspended in 50 ml of purified decane and then added with 31 ml (0.2 mol) of 2-ethylhexylalcohol. While being stirred, this suspension was slowly heated to 110° C., and left for 2 hours, to give a homogeneous, colorless, clear solution without any particles.

After its temperature being lowered to room temperature, the clear solution was slowly added dropwise with 33 ml (0.3 mol) of titanium tetrachloride. This resulting reaction system was heated to 80° C. and left at this temperature for 2 hours, to complete the reaction with titanium tetrachloride. As a result, a catalyst of solid phase was prepared.

Polymerization of Olefins

Under the condition of Example 1, polymerization of ethylene was carried out, using the catalyst prepared.

The properties of the polymer obtained were measured, and the results are give as shown in the following Table 1.

Comparative Example 2

A catalyst was prepared in a manner similar to that of Comparative Example 1.

Polymerization of ethylene utilizing the catalyst was carried out in a manner similar to Comparative Example 1, except for without charging hydrogen.

As a result of measurement according to ASTM D4020-81, the polymer obtained showed intrinsic viscosity value of about 12.4, which value, when calculated in terms of weigh average molecular weight, represents about 1.7 million.

The properties of the polymer obtained were measured, and the results are give as shown in the following Table 1.

Comparative Example 3

Preparation of Catalyst

Under nitrogen influx, 4.76 g (0.05 mol) of anhydrous magnesium chloride was suspended in 50 ml of purified decane, and this suspension was added with 31 ml (0.2 mol) of 2-ethylhexyl alcohol and 0.6 ml (0.005 mol) of tetrahydrofurfuryl alcohol, an electron donor comprising both a hydroxy group and an ether group. While being stirred, this suspension was slowly heated to 110° C., and left for 2 hours, to give a homogeneous, colorless, clear solution without any particles.

To this, 33 ml (0.3 mol) of titanium tetrachloride was slowly added dropwise. This resulting reaction system was heated to 80° C. and left at this temperature for 2 hours, to complete the reaction with titanium tetrachloride. As a result, a catalyst of solid phase was prepared.

Polymerization of Olefins

Under the condition of Example 1, polymerization of ethylene was carried out, using the catalyst prepared.

The properties of the polymer obtained were measured, and the results are give as shown in the following Table 1.

Comparative Example 4

A catalyst was prepared in a manner similar to that of Comparative Example 3, except that, instead of tetrahydrofurfuryl alcohol, 0.7 ml (0.005 mol) of ethyl benzoate was used as an electron donor.

Polymerization of ethylene utilizing the catalyst was carried out in a manner similar to Comparative Example 3, as well.

The properties of the polymer obtained were measured, and the results are give as shown in the following Table 1.

TABLE 1

| | Properties of Polyethylenes obtained | | | | | |
|---|---|---|---|---|---|---|
| Exam. No. | Content of Ti (wt %) | Amount of H. charge (kg/cm2) | Activity (g/g)* | Distri. of Mw. (Mw/Mn) | Melt Index (g/10 min) | Bulk Density (g/cm3) |
| 1 | 6.9 | 1.5 | 19,700 | 8.52 | 0.21 | 0.38 |
| 2 | 4.2 | 1.5 | 9,500 | 9.43 | 0.64 | 0.38 |
| 3 | 9.6 | 1.5 | 7,200 | 7.89 | 0.09 | 0.37 |
| 4 | 6.4 | 1.5 | 12,000 | 10.04 | 0.38 | 0.35 |
| 5 | 7.2 | 1.5 | 12,800 | 7.38 | 0.07 | 0.39 |
| 6 | 7.6 | 1.5 | 16,500 | 8.46 | 0.45 | 0.35 |
| 7 | 7.4 | 1.5 | 19,200 | 9.26 | 0.32 | 0.40 |
| 8 | 6.7 | 1.5 | 18,500 | 7.76 | 0.79 | 0.38 |
| 9 | 7.6 | 1.5 | 17,900 | 8.34 | 0.14 | 0.38 |
| 10 | 6.8 | 1.5 | 13,200 | 8.70 | 0.49 | 0.37 |
| 11 | 4.1 | 0 | 25,400 | — | — | 0.36 |
| 12 | 7.8 | 1.5 | 16,400 | 9.61 | 0.87 | 0.36 |
| C-1 | 3.3 | 1.5 | 9,800 | 8.96 | 0.48 | 0.31 |
| C-2 | 3.3 | 0 | 13,600 | — | — | 0.32 |
| C-3 | 8.0 | 1.5 | 10,800 | 7.74 | 0.08 | 0.34 |
| C-4 | 4.3 | 1.5 | 12,700 | 8.43 | 0.23 | 0.32 |

*g of polyethylene per g of catalyst.

EXAMPLE 13

Preparation of Catalyst

In 1 L glass reactor, 4.76 g (0.05 mol) of $MgCl_2$ and 50 ml of n-decane were added, together. After being stirred at room temperature in nitrogen ambient, this suspension was slowly added with 25 ml (0.16 mol) of 2-ethylhexylalcohol. Then, the suspension was heated to 120° C., and left for 2 hours for the reaction of 2-ethylhexylalcohol. To this, 2 ml of diisobutylphthalate was added and reacted for 1 hour, so as to obtain a homogeneous solution.

Thereafter, the homogeneous solution was cooled to room temperature, in which 100 ml of titanium tetrachloride was then added dropwise. This resulting reaction system was heated to 90° C. and left at this temperature for 2 hours, to form solid phase.

As a secondary electron donor, 1.2 g (0.007 mol) of monoethyleneglycol monobenzoate was added and then reacted at 100° C. for 1 hour. As a result, there was obtained a precipitate.

The precipitate was filtered and collected, and then washed with purified hexane enough to find no free titanium tetrachloride in the cleanser. To the washed solid, another purified heptane was added and followed by the addition of 100 ml of titanium tetrachloride.

To activate the reaction of the resulting system, it was then heated to 100° C., and maintained in this state for 2 hours, so as to give solid complex. This solid complex was washed with purified hexane until there was found no free titanium tetrachloride in the cleanser at last.

Solid complex prepared was dried and stored in nitrogen ambient for use. The solid complex was found to contain 4.3% by weight of titanium atom therein.

Polymerization of Olefins 30 mg of the catalyst prepared (when calculated in terms of titanium atom, 0.04 mmol of titanium component) was put into a vial, which was, in turn, mounted in a 1 L high pressure Parr reactor(commercially available under the model name of #4521). The interior of the reactor was purged with nitrogen gas and subsequently evacuated. After the purge and vacuum was repeated 3 times, 5 mmol of triethyl aluminum and 0.5 mmol of cyclohexylmethyldimethoxy silane was charged into the reactor evacuated finally, along with 500 ml of n-hexane. Thereafter, 300 ml of hydrogen was further charged into the reactor, which was then heated to 70° C.

A propylene gas which had experienced oxygen scavenger and molecular sieve trap was led to pass through a mass flow controller and then charged into the reactor. When the propylene reached the equilibrium state between gas and liquid at 6 kg/cm$^2$ of overall pressure in the reactor, the vial in the reactor was broken, to initiate the polymerization reaction of propylene, and then the polymerization reaction proceeded for 1 hour.

After the completion of the polymerization reaction, the contents in the high pressure body was cooled to room temperature. Then, about 10 ml of ethanol was poured to the catalyst, to eliminate the active point thereof.

At this time, product obtained was filtered and collected, and dried in 50° C. vacuum oven for 6 hours, to give 89.0 g of polypropylene as white powder.

This polymer was characterized by 96.8% of boiling n-heptane-extracted remainder ratio, 0.34 g/ml of apparent density and 2.9 g/10 min. of melt index, as summarized in the following Table 2.

EXAMPLE 14

A catalyst was prepared in a manner similar to that of Example 13, except that, instead of monoethyleneglycol monobenzoate, 1.47 g (0.007 mol) of diethyleneglycol monobenzoate was used as a secondary electron donor. The catalyst prepared contained 4.7% by weight of titanium atom.

Polymerization of propylene utilizing the catalyst was carried out in a manner similar to Example 13, as well, so as to obtained 84 g of polypropylene as white powder.

This polymer was characterized by 97.1% of boiling n-heptane-extracted remainder ratio, 0.35 g/ml of apparent density and 2.7 g/10 min. of melt index, as summarized in the following Table 2.

EXAMPLE 15

A catalyst was prepared in a manner similar to that of Example 13, except that, instead of monoethyleneglycol monobenzoate, 1.78 g (0.007 mol) of triethyleneglycol monobenzoate was used as a secondary electron donor. The catalyst prepared contained 4.5% by weight of titanium atom.

Polymerization of propylene utilizing the catalyst was carried out in a manner similar to Example 13, as well, so as to obtained 79 g of polypropylene as white powder.

This polymer was characterized by 97.3% of boiling n-heptane-extracted remainder ratio, 0.34 g/ml of apparent density and 2.8 g/10 min. of melt index, as summarized in the following Table 2.

Comparative Example 5

In 1 L glass reactor, 4.76 g (0.05 mol) of MgCl$_2$ and 50 ml of n-decane were added, together. After being stirred at room temperature in nitrogen ambient, this suspension was slowly added with 25 ml (0.16 mol) of 2-ethylhexylalcohol. Then, the suspension was heated to 120° C., and left for 2 hours for the reaction of 2-ethylhexylalcohol. To this, 0.9 ml of ethylbenzoate was poured and led to reaction for 1 hour, so as to obtain a homogeneous solution. Thereafter, this homogeneous solution was cooled to room temperature, in which 100 ml of titanium tetrachloride was then added dropwise. This resulting reaction system was heated to 90° C. and left at this temperature for 2 hours, to form solid phase.

To this, 2 ml of diisobutylphthalate was added and reacted for 1 hour. As a result, there was obtained a precipitate.

The precipitate was filtered and collected, and then washed with purified hexane enough to find no free titanium tetrachloride in the cleanser. To the washed solid, another purified heptane was added and followed by the addition of 100 ml of titanium tetrachloride.

To activate the reaction of the resulting system, it was then heated to 100° C., and maintained in this state for 2 hours, so as to give solid complex. This solid complex was washed with purified hexane until there was found no free titanium tetrachloride in the cleanser at last.

Solid complex prepared was dried and stored in nitrogen ambient for use. The solid complex was found to contain 4.6% by weight of titanium atom therein.

Polymerization of propylene utilizing the same amount-(when calculated in terms of titanium atom) of the solid complex was carried out in a manner similar to Example 13, as well, so as to obtained 74 g of polypropylene as white powder.

This polymer was characterized by 95.2% of boiling n-heptane-extracted remainder ratio, 0.35 g/ml of apparent density and 1.7 g/10 min. of melt index, as summarized in the following Table 2.

Comparative Example 6

In 1 L glass reactor, 4.76 g (0.05 mol) of MgCl$_2$ and 50 ml of n-decane were added, together. After being stirred at room temperature in nitrogen ambient for 1 hour, this suspension was slowly added with 25 ml (0.16 mol) of 2-ethylhexylalcohol. Then, the suspension was heated to 120° C., and left for 2 hours for the reaction of 2-ethylhexylalcohol. To this, 2 ml of diisobutylphthalate was added and reacted for i hour, so as to obtain a homogeneous solution.

Thereafter, the homogeneous solution was cooled to room temperature, in which 100 ml of titanium tetrachloride was then added dropwise. This resulting reaction system was slowly heated to 90 ° C. and left at this temperature for 2 hours. 1 ml of diisobutylphthalate was further added to the reaction system and subjected to reaction over 1 hour. As a result, there was obtained a precipitate.

The precipitate was filtered and collected, and then washed with purified hexane enough to find no free titanium tetrachloride in the cleanser. To the washed solid, another purified heptane was added and followed by the addition of 100 ml of titanium tetrachloride.

To activate the reaction of the resulting system, it was then heated to 100° C., and maintained in this state for 2 hours, so as to give solid complex. This solid complex was washed with purified hexane until there was found no free titanium tetrachloride in the cleanser at last.

The solid complex prepared was dried and stored in nitrogen ambient for use. The solid complex was found to contain 4.7% by weight of titanium atom therein.

Polymerization of propylene utilizing the same amount-(when calculated in terms of titanium atom) of the catalyst was carried out in a manner similar to Example 13, as well, so as to obtained 72.0 g of polypropylene as white powder.

This polymer was characterized by 96.5% of boiling n-heptane-extracted remainder ratio, 0.36 g/ml of apparent density and 2.8 g/10 min. of melt index, as summarized in the following Table 2.

but also improving the bulk density of the polymer, especially polyethylene.

Further, the catalyst is prepared by the method according to the present invention, in economy and ease.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. An olefin polymerization catalyst consisting of magnesium, titanium, halogen, and an electron donor, wherein the electron donor is selected from the group consisting of: 2-hydroxyethyl methacrylate, 2-hydroxyethyl acrylate, 2-hydroxypropyl methacrylate, 2-hydroxypropyl acrylate, diethyl 3-hydroxyglutarate, 2-hydroxyethyl acetate, methyl 3-hydroxybutylate, ethyl 2-hydroxyisobutylate, methyl 3-hydroxy-2-methylpropionate, t-butyl-2-hydroxyisobuty-

TABLE 2

| Exam. No. | Electron* Donor | Properties of Polypropylenes obtained | | | | | Melt Index (g/10 min) |
|---|---|---|---|---|---|---|---|
| | | Amount of Ti | | Content Product Extract App. | | | |
| | | (mol) | (wt %) | Amount (g) | Ratio (%) | Density (g/ml) | |
| 13 | MEGMB | 1.2 g (0.007) | 4.3 | 89 | 96.8 | 0.34 | 2.9 |
| 14 | DEGMB | 1.47 g (0.007) | 4.7 | 84 | 97.1 | 0.35 | 2.7 |
| 15 | TEGMB | 1.78 g (0.007) | 4.5 | 79 | 97.3 | 0.34 | 2.8 |
| C-5 | DBP | 2 ml (0.007) | 4.6 | 74 | 95.2 | 0.35 | 1.7 |
| C-6 | DBP | 1 ml (0.0035) | 4.7 | 72 | 96.5 | 0.36 | 2.8 |

*MEGMB: monoethyleneglycol monobenzoate
DEGMB: diethyleneglycol monobenzoate
TEGMB: triethyleneglycol monobenzoate
DBP: diisobutylphthalate From the examples and the tables, it is apparent that the catalyst according to the present invention is superior in activity as well as production yield in polymerizing olefins.

In addition, the catalyst of the present invention is capable of not only providing the polymer with high stereoregularity late, ethyl lactate, isopropyl lactate, butyl lactate, isobutyl lactate, monoethyleneglycol monobenzoate, diethyleneglycol monobenzoate, triethyleneglycol monobenzoate, and 2-hydroxyethylbenzoate.

\* \* \* \* \*